(12) United States Patent
Hukkanen (10) Patent No.: US 10,011,310 B2
(45) Date of Patent: Jul. 3, 2018

(54) FRAME AND ARRANGEMENT IN VEHICLE OR MACHINE

(75) Inventor: Pentti Hukkanen, Kiuruvesi (FI)

(73) Assignee: PONSSE OYJ, Vierema (FI)

( * ) Notice: Subject to any disclaimer, the term of this patent is extended or adjusted under 35 U.S.C. 154(b) by 0 days.

(21) Appl. No.: 14/001,363

(22) PCT Filed: Feb. 20, 2012

(86) PCT No.: PCT/FI2012/050164
§ 371 (c)(1),
(2), (4) Date: Sep. 3, 2013

(87) PCT Pub. No.: WO2012/113981
PCT Pub. Date: Aug. 30, 2012

(65) Prior Publication Data
US 2013/0341105 A1    Dec. 26, 2013

(30) Foreign Application Priority Data
Feb. 25, 2011 (FI) .................. 20115190

(51) Int. Cl.
*B62D 53/02* (2006.01)
*B62D 21/18* (2006.01)
*A01G 23/00* (2006.01)

(52) U.S. Cl.
CPC .......... *B62D 53/023* (2013.01); *A01G 23/00* (2013.01); *B62D 21/186* (2013.01); *B62D 53/028* (2013.01)

(58) Field of Classification Search
CPC .............................. B60D 7/00; B60D 2001/00
USPC ....................................................... 180/418
See application file for complete search history.

(56) References Cited

U.S. PATENT DOCUMENTS

| | | | |
|---|---|---|---|
| 3,480,098 A * | 11/1969 | Ward, Jr. ............ | B62D 49/08 180/41 |
| 3,605,908 A * | 9/1971 | McDonald et al. .......... | 172/438 |
| 3,631,615 A | 1/1972 | Dunlap | |
| 4,022,290 A * | 5/1977 | Boyer ................. | B62D 53/005 180/14.1 |
| 4,991,673 A * | 2/1991 | Ericsson ......................... | 180/41 |
| 5,632,350 A * | 5/1997 | Gauvin ........................ | 180/9.44 |
| 5,700,023 A | 12/1997 | Picard | |
| 6,488,291 B1 * | 12/2002 | Bellis, Jr. ............. | B62D 49/065 280/32.7 |

(Continued)

FOREIGN PATENT DOCUMENTS

| | | |
|---|---|---|
| CN | 1121339 A | 4/1996 |
| EP | 1 186 567 A1 | 3/2002 |
| EP | 1 261 515 B1 | 12/2005 |

(Continued)

*Primary Examiner* — Joseph M Rocca
*Assistant Examiner* — Felicia L. Brittman
(74) *Attorney, Agent, or Firm* — Birch, Stewart, Kolasch & Birch, LLP (57) ABSTRACT

A vehicle or machine suitable for operation on uneven or inclined surfaces, such as a forest work unit, comprises at least three frame parts and two rotational planes. Each frame part has rotational planes, in each particular case, on an interface between two successive frame parts of the vehicle or machine. The rotational planes are, in each particular case, planes perpendicular to the longitudinal axis of the vehicle or machine in the neutral position. The frame parts are thus arranged to be independently rotatable in relation to the rotational plane.

18 Claims, 3 Drawing Sheets

(56) References Cited

U.S. PATENT DOCUMENTS 7,421,952 B2 * 9/2008 Taylor .................... B61D 15/02
104/2

FOREIGN PATENT DOCUMENTS

| FR | 2 709 140 A1 | 2/1995 | |
|----|----|----|----|
| FR | 2709140 A1 * | 2/1995 | |
| GB | 2 319 233 A | 5/1998 | |
| SE | 506 737 C2 | 2/1998 | |
| WO | WO 90/02681 | 3/1990 | |
| WO | WO 94/23985 A1 | 10/1994 | |
| WO | WO 01/66407 A1 | 9/2001 | |
| WO | WO 2008097146 A1 * | 8/2008 | ........... A01G 23/081 |

\* cited by examiner

FRAME AND ARRANGEMENT IN VEHICLE OR MACHINE

BACKGROUND OF THE INVENTION

The invention relates to an arrangement in a moving vehicle or machine, comprising at least three frame parts.

Further, the invention relates to a method in connection with a vehicle or machine.

Various moving vehicles and machines frequently have to work on terrains which are uneven in different ways, as well as on inclined surfaces, whereby it is important to enable, in one way or another, sufficient con-tact of the wheels and/or tracks of the vehicle or machine with the ground. It is usually desirable to maintain as good contact with the ground or other working surface as possible for several different reasons, including the tractive power of the vehicle, good roadholding between the surface and the vehicle, as low surface pressure on the ground as possible, or good stability. Such properties are typically emphasized in cross-country vehicles or machines, in particular, such as in military vehicles or various forestry machines used for mechanical harvesting. This may be made possible, if desired, by allowing shafts, axles or, particularly in cases of frame-steered machines, separate frames to rotate relative to each other. As regards such rotation of frames, various arrangements for preventing or controlling the rotating motion are known. One such solution is shown in publication EP1261515.

For example in the case of the operating environment of a forestry machine, the terrain is, almost without exception, uneven and working frequently takes place on a significantly inclined surface. With regard to the driver ergonomics as well as to boom assemblies, cranes and manipulators commonly used in forestry machines and, in particular, the usability of these rotating devices, it is also important to be able to effectively minimize the effect of the inclined surface with various technical solutions. A plurality of different solutions for solving problems brought about by an inclined or uneven surface are known, for instance the solution disclosed in publication U.S. Pat. No. 4,991,673.

It is known to fit two separate frames of a forestry machine or another moving working machine to each other by both what is called a frame steering joint enabling steering of the working machine and a rotating joint enabling independent rotation of the frames substantially in relation to the longitudinal axis of the vehicle.

BRIEF DESCRIPTION OF THE INVENTION

It is an object of the present invention to provide a novel and improved frame structure and arrangement in a vehicle or machine.

The method according to the invention is characterized by a vehicle or machine being a forest work unit, and the method comprises forming the frame of the vehicle or machine of at least three frame parts; forming at least two rotational planes between the frame parts; and enabling independent rotation of the frame parts positioned, in each particular case, substantially successively in the longitudinal direction of the frame and separated by a rotational plane around a longitudinal axis or an axis in the vicinity thereof and substantially parallel thereto in the direction of the rotational plane in such a way that the independent rotation of the successive frame parts separated by at least one of the rotational planes around the longitudinal axis is controllable.

The vehicle or machine is a forest work unit and that the arrangement comprises at least two rotational planes. Each of which rotational planes is arranged to be formed on an interface which separates, in each particular case, two frame parts positioned substantially successively in the longitudinal direction of the frame of the vehicle or machine from each other. The frame parts are arranged, in relation to each of the rotational planes, at least rotationally substantially around a longitudinal axis of the vehicle or machine or an axis in the vicinity thereof and substantially parallel thereto, and the independent rotation of the successive frame parts separated by at least one of the rotational planes around said shaft being controllable.

The idea of the invention is that the vehicle or machine is dividable into at least three sections or blocks which are, in the neutral position, arranged substantially in the longitudinal direction of the vehicle or machine and are at least rotatable in relation to each other around the longitudinal axis of the machine.

An advantage of the invention is that it is possible to implement, with simple structures, a vehicle or machine at least one frame part of which can be easily straightened into a horizontal position in relation to the rotation around the longitudinal axis of the vehicle or machine.

The rotation of successive frame parts separated by at least one of the rotational planes around the longitudinal axis or an axis in the vicinity thereof and substantially parallel thereto is actively controllable.

The rotational position of a frame part arranged between two other frame parts and separated by rotation-al planes is arranged to be controllable independently of the rotational position of the adjacent frame parts.

The arrangement comprises at least one rotation control actuator for controlling rotation in relation to at least one rotational plane.

The arrangement comprises at least one mounting structure, whose cross-profile formed in the direction of the longitudinal axis is arrangeable substantially horizontally in relation to the inclination in the direction of the longitudinal axis of the vehicle or machine.

The arrangement comprises at least one actuator for rotating the mounting structure in relation to the frame part around an axis in the direction of the inclination in the direction of the longitudinal axis of the vehicle or machine.

At least one actuator is simultaneously arranged to control rotation of two successive frame parts on a rotational plane.

The mounting structure is provided with means for rotating the mounting structure in such a way that a cross-profile formed substantially In the transverse direction in relation to the longitudinal axis of the vehicle or machine is rotatable around an axis substantially parallel to the longitudinal axis in relation to the frame part in which the mounting structure is arranged.

The independent rotation of the frame parts fitted to each other in the direction of the rotational plane is arranged, in each particular case, by means of a rotating joint with at least one degree of freedom.

Two frame parts positioned successively in the direction of the longitudinal axis of the vehicle or machine frame are connected to each other with a joint that allows rotation around a substantially vertical axis of revolution that is substantially perpendicular to the longitudinal direction of the vehicle or machine frame to improve and/or enable steerability.

The middlemost frame part is guided into a substantially horizontal position substantially continuously or when desired in relation to the rotation around the longitudinal axis of the vehicle or machine.

BRIEF DESCRIPTION OF FIGURES

The invention will be explained in greater detail in the attached drawings, in which.

In the figures, some embodiments of the invention are shown simplified for the sake of clarity. Like reference numerals refer to like parts in the figures.

DETAILED DESCRIPTION OF THE INVENTION

The present arrangement is advantageous for vehicles and machines moving on an uneven terrain, particularly forest work units, for instance harvesters, forwarders or combinations of these.

The present solution allows implementation of a vehicle or machine with simple structures, in this case a forest work unit comprising at least three blocks or sections that are connectable to each other with connecting members or structures allowing at least rotation in relation to the longitudinal axis of the vehicle or machine or in relation to another rotation axis substantially parallel thereto. Thus, at least one of these blocks or sections that are referred to as frame parts in the description is arrangeable substantially horizontally in relation to the rotation around said rotation axis.

This can be implemented so that the above-described compensation for lateral inclination can be implemented very close to the ground, which gives several advantages, such as minimization of the frequency, acceleration and/or amplitude of the lateral oscillation the driver is subjected to and, through this, use of faster driving speeds. Particularly in the embodiments where the cabin is arranged in said frame part. The blocks or sections are called frame parts. A vehicle or machine 1 refers, hereinafter, to a forest work unit, for example a harvester, forwarder or a combination of these.

With regard to the driver's working ergonomics, it is particularly significant that in inclined places the driver, who is normally exposed to lateral oscillation, can be kept substantially immobile in the lateral direction (translation). Naturally, the driver and his/her seat can be kept substantially horizontal with known solutions, but these solutions do not typically solve the significant problem related to translational motion.

The invention enables extensive plays in relation to the longitudinal rotation of the frame, whereby these plays are more extensive than those which can usually be achieved by known solutions, for example by one rotating joint. More extensive plays, in turn, enable improved stability and moving capability particularly on a difficult, uneven and/or inclined terrain. Thus, a vehicle or machine like this has exceptionally good cross-country properties.

Further, the invention enables, particularly when using rocker tandem axles, a higher driving speed than in known solutions in such a way that the position stabilization system has time to react sufficiently to the unevenness of the terrain. This is further facilitated by the capability of the rocker tandem axles to reduce substantially vertical speeds and accelerations that the machine is subjected to when moving over an obstacle. The present invention also makes it possible to arrange the rocker tandem axle in the vehicle or machine as a pendulum shaft rotating in relation to the longitudinal direction of the vehicle or machine.

Figure 1A:
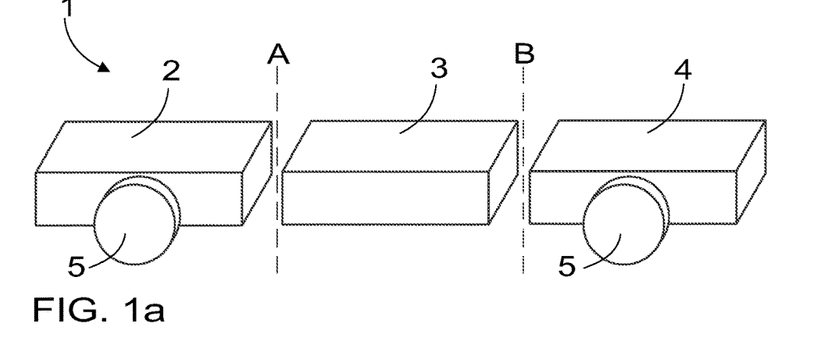
FIG. 1a is a schematic view of an arrangement of the invention.

FIG. 1a is a schematic view of the vehicle or machine 1. The vehicle or machine 1 may comprise at least three sections or blocks, later referred to as frame parts 2, 3 and 4, which may be arrangeable successively in relation to each other substantially in the longitudinal direction of the vehicle or machine 1, which is usually also the direction of travel of the vehicle or machine 1. In the figures, all frame parts 2, 3 and 4 are shown as being of the same size, but the frame parts 2, 3 and 4 may be different from each other, with regard to both the size and other properties.

The vehicle or machine 1 may further comprise at least two rotational planes A and B, each of which is formed on an interface which each separates two frame parts positioned successively in the longitudinal direction of the frame of the vehicle or machine 1. The frame parts of the vehicle or machine 1 being, in relation to each of the rotational planes, rotatable as blocks around a longitudinal axis C of the vehicle or machine 1, in this case a forest work unit, or around an axis in the vicinity thereof, preferably at a distance of not more than about 0.5 m, and substantially parallel thereto. Thus, each block separated by a rotational plane or planes may be rotatable around the longitudinal axis C of the vehicle or machine 1 in such a way that each rotational plane A and B is substantially perpendicular to the longitudinal axis C when the vehicle or machine 1 is in its neutral position. In other positions, it is perpendicular to the direction of the longitudinal axis C at the location of a frame part 2, 3, 4 separated by respective rotational planes A or B. Further, the independent rotation of successive frame parts separated by at least one of the rotational planes A, B around the longitudinal axis C or an axis in the vicinity thereof and substantially parallel thereto may be controllable, for example controllable actively or partially or completely lockable into a given position, for instance into each rotational position, the neutral position or another predetermined position. The rotational plane A, B is thus a planar surface perpendicular to the longitudinal axis C of the vehicle or machine 1 although it is shown, for the sake of clarity, by dash lines A and B.

Rotation taking place in the direction of each rotational plane A, B may, in each case, be implemented with any structure that allows rotation, for example with a rotating joint with at least one degree of freedom. Such solutions are known from, for instance, vehicles and/or machines formed of two frame parts, where the rotation of the frame parts can be controlled in relation to each other, for instance from publication EP1261515. They may comprise, for example, a shaft mounted on a bearing from at least one direction, for example a ball bearing, another roller bearing, a slide bearing or another bearing that is strong enough.

In different embodiments, each frame part 2, 3, 4 may be an actual separate frame part of the machine or even a mere shaft arranged, in each case, in the preceding and/or the next frame part rotatably in relation to the rotational plane A or B around the longitudinal axis C of the vehicle or machine 1, such as a pendulum shaft, for example a rocker tandem axle, a track system, an individual shaft or the like shaft, possibly with required structural and/or fastening parts. The shaft of the mentioned type may thus form the frame part in embodiments where this shaft, alone or with related structural and/or fastening parts, can be connected to one or two other frame parts. In other words, it may be arranged rotatably in the manner described above at the end of one frame part or between two other frame parts, but to enable rotation of the described type, it cannot be arranged from both directions in the same frame part for instance below such frame part. Hence, in accordance with the solutions disclosed in this document, a complete rocker tandem axle can be made rocking in a simple manner as a frame part.

In addition to the frame parts 2, 3, 4 and the rotational planes A, B, the vehicle or machine 1 may comprise a required number of parts, including frame parts, devices, systems, components and other structural parts which are typical of vehicles and/or machines but not shown. Each of these structural parts may be, in each case, arranged in one or more frame parts 2, 3, 4 in elements implementing the rotational plane A, B or in another structural part of the vehicle or machine 1. The frame parts 2, 3, 4 may be connected to each other or to frame parts not shown by a part or structure known as such, as far as the rotation of the frame parts separated by the rotational plane A, B in relation to each other is possible in the manner described above.

In FIG. 1a, the first frame part 2 and the third frame part 4 are provided with wheels 5, but in different embodiments the vehicle or ma-chine 1 may be provided with a suitable number of wheels, tracks, tandem shafts, track systems or other structural parts required for movement of the machine These may be arranged, in each case, in connection with one or more frame parts shown or not shown. In other words, one or more wheels, track systems, tandem shafts or the like may be, in various ways, arranged in any frame part 2, 3, 4, in any frame or structural part not shown, in several of these or their combinations. In some embodiments, it may be preferable to form that frame part the stabilization of which is particularly preferable, such as the frame part where the cabin and/or boom system may be arranged, without wheels, track systems, tandem shafts or the like.

Figure 1B:
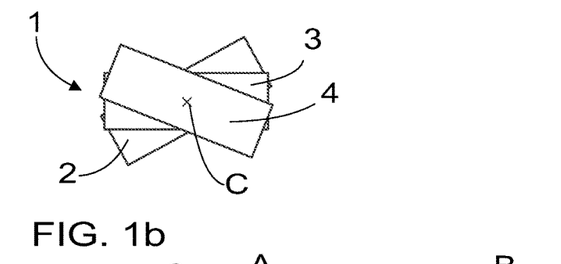
FIG. 1b is a schematic view of an arrangement of the invention, seen from an end of the vehicle or machine.

FIG. 1b shows three frame parts 2, 3, 4, seen from the end of the vehicle or machine 1 on the side of the frame part 4. In the operating or travel position according to FIG. 1b, the frame parts have rotated in such a way relative to each other that the second frame part 3 is substantially in the horizontal position, i.e. the neutral position, the frame part 2 has rotated in the direction of the rotational plane A counter-clockwise, as seen in the figure, and the frame part 3 has rotated clockwise in the direction of the rotational plane B as seen in the figure. The rotational planes A and B are thus substantially perpendicular to the longitudinal axis C of the vehicle or machine 1. Preferably, the rotational position of a frame part arranged between two other frame parts, such as frame part 3, may be arranged to be controlled independently of the rotational position of the adjacent frame parts. Particularly preferably, the middlemost frame part may be arranged to be guided into a substantially horizontal position substantially continuously or when desired in relation to the rotation around the longitudinal axis C of the vehicle or machine 1.

Figure 2A:
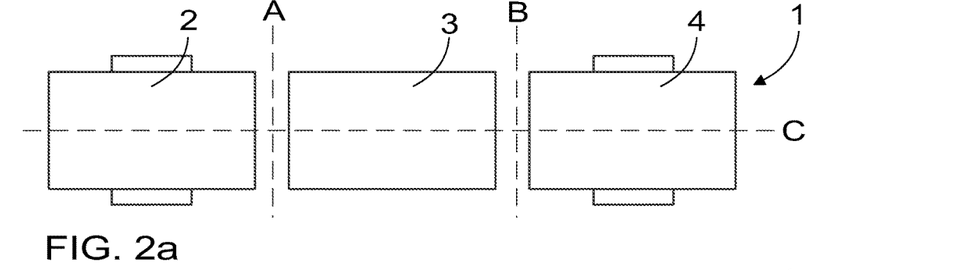
FIG. 2a is a schematic a top view of an arrangement of the inven-tion in the neutral position.

FIG. 2a shows a top schematic view of a machine or vehicle 1 in the neutral position, whereby the frame parts 2, 3 and 4 are arranged successively in the direction of the longitudinal axis C of the machine or vehicle 1. The longitudinal axis C is thus, in this neutral position, a substantially continuous straight line, and the rotational planes A, B are, in relation thereto, substantially perpendicular planar interfaces. In various embodiments and operating situations, the frame parts 2, 3, 4 may move, in relation to each other and the longitudinal axis C, within the limits allowed by the clearances and plays of the frame parts and structures connecting them. For instance, they may rotate +/−40 degrees relative to each other, for example, or turn +/−45 degrees relative to each other, for example.

Figure 2B:
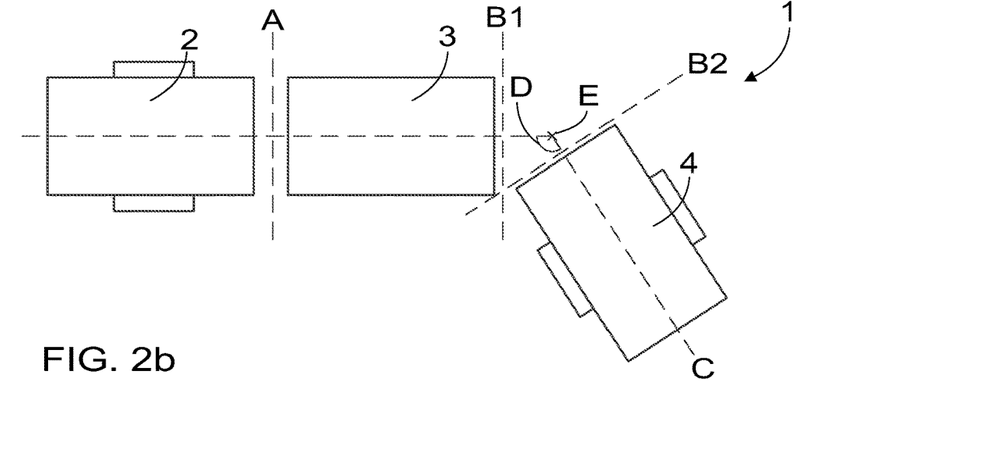
FIG. 2b is a schematic a top view of an arrangement of the inven-tion in an operating position.

FIG. 2b shows a vehicle or machine 1 corresponding to that in FIG. 2a in an operating position. In this embodiment, the vehicle or machine 1 is provided with a joint connecting together at least two frame parts positioned successively in the longitudinal direction of the frame of the vehicle or machine 1, which joint allows rotation around a substantially vertical axis E that is substantially perpendicular to the longitudinal axis C of the frame of the vehicle or machine 1 to improve and/or enable steerability of the vehicle or machine 1. In the figure, the frame part 4 has rotated relative to the frame part 3 around said substantially vertical axis E, for example in connection with steering of the vehicle or machine 1. The rotation has an angle D, and the longitudinal axis C of the vehicle or machine 1 correspondingly forms a dash line with an angle between the frame parts 3 and 4. The rotational plane B is thus formed in the plane B1 or B2 shown in the figure, depending on the structures connecting the frame parts 3 and 4. In certain embodiments, even two rotational planes, for instance B1 and B2, may be formed between two successive frame parts if, for instance, two rotating joints are arranged between the frame parts. In various embodiments, there may be one or more such joints allowing rotation around a vertical axis, or they may be arranged, in each case, between two frame parts of the vehicle or machine 1. In such a case, on the longitudinal axis C, the number of angles formed corresponds to the number of joints.

Figure 3:
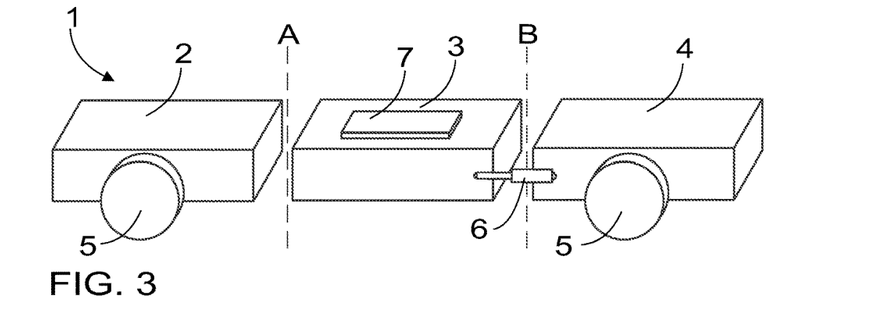
FIGS. 3, 4, 5 and 6 are schematic views of some arrangements of the invention.

FIG. 3 shows an embodiment of the vehicle or machine 1 that comprises a rotation control actuator 6 for controlling rotation relative to the rotational plane B. The rotation control actuator 6 may be any actuator used in vehicles and/or machines, for example a pressure-medium-operated actuator, such as a hydraulic cylinder which can be controlled in any known manner, for instance hydraulically and/or electrically. In various embodiments, a rotation control system of another kind may be used in addition to and/or instead of the rotation control actuator 6. There may be one or more such rotation control actuators 6 or rotation control systems per rotational plane, depending on the embodiment, and one or more of said rotational planes may be provided with them.

Further, in the embodiment of FIG. 3, the vehicle or machine 1 comprises at least one mounting structure 7 which is arranged in connection with at least one frame structure, preferably on the upper surface of the frame part or in the vicinity thereof. In various embodiments, there may be several of these mounting structures 7. The mounting structure 7 may comprise one or more parts which may form a part of the frame part or be connected thereto. The mounting structure 7 may further be guided to move around the longitudinal axis C, for instance by controlling, in the manner shown in FIG. 1b, the rotational position of the frame part in connection with which the mounting structure 7 is arranged in relation to the frame parts connected thereto and separated by rotational planes, such as rotational planes A and B. Further, the mounting structure 7 may be guided to move around an axis substantially parallel with the longitudinal axis C in relation to frame part 2, 3, 4 to which the mounting structure 7 is connected, for instance in the manner shown in FIG. 7, where the mounting structure 7 is rotatable around an axis G substantially parallel with the longitudinal axis C. Thus, the cross-profile of the mounting structure 7, formed substantially in the transverse direction in relation to the direction of the longitudinal axis C of the vehicle or machine 1, is preferably guidable into a horizontal position. In other words, the mounting structure 7 is thus preferably guidable into a substantially horizontal position in relation to the lateral rotation of the vehicle or machine 1.

Arranged in the mounting structure 7, there may be, for example, the cabin of the vehicle or machine 1, whose position is preferably as stabile and horizontal as in view of occupational hygiene and occupational safety, and/or the boom system of a forestry machine. The position of the boom system is preferably as horizontal as possible to maximize the utilization of power available, for example. In different embodiments, the cabin and/or crane or another boom system of a vehicle or machine 1 may be supported by substantially the same mounting structure 7. In yet some embodiments, preferably at least the primary power source of the vehicle or machine 1, such as a diesel engine, and preferably also the other desired power transmission parts may, if desired, be arranged in said mounting structure 7, which may be particularly preferable for instance in connection with particularly steep and/or inclined working environments and conditions to optimize the operation of the fuel supply, lubrication system and various tanks as well as the stability of the vehicle or machine and/or to prevent the effect of the inclination of the frame part on the outer dimensions of the vehicle or machine in, for example, narrow working conditions.

Figure 4:
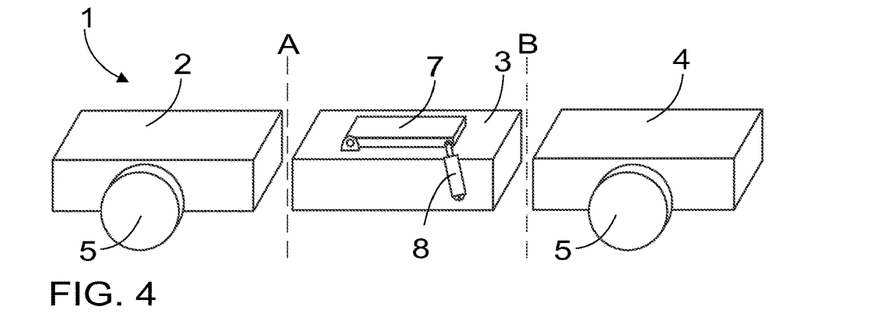

FIG. 4 shows an embodiment where the mounting structure 7 is provided with an actuator 8 for controlling the position of the mounting structure in relation to the inclination in the direction of the longitudinal axis C of the vehicle or machine 1 with a rotating motion directed around an axis F substantially perpendicular to the direction of the longitudinal axis C. The actuator may be, for example, a pressure medium-operated actuator, such as a hydraulic cylinder, an electric actuator generating linear motion, or another actuator suitable for the purpose. There may be one or several actuators 8 per mounting structure 7. Preferably, the cross-profile of the mounting structure, formed in the longitudinal direction of the rotation axis C, is guidable into a horizontal position or as close to a horizontal position as possible in relation to the inclination in the direction of the longitudinal axis C of the vehicle or machine 1. In other words, the mounting structure 7 is guidable into a substantially horizontal position or as close to it as possible in the direction of travel of the machine. In different embodiments, the actuator 8 may be replaced with a system of another kind, with which the mounting structure 7 can be rotated in relation to the frame part 3 around the axis F.

Figure 5:
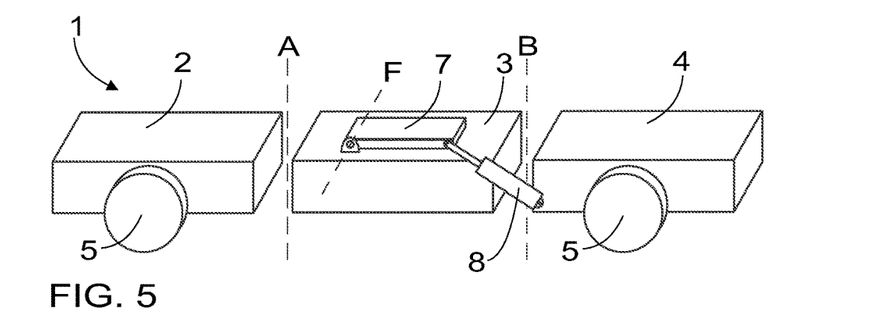

FIG. 5 shows an embodiment where the actuator 8 can be used both for guiding the mounting structure 7 in relation to the inclination in the direction of the longitudinal axis C of the vehicle or machine 1 and for controlling the rotation taking place in relation to the rotational plane B.

Naturally, the solutions shown in FIGS. 4 and 5 may also comprise one or more rotation control actuators 6 or rotation control systems for controlling rotation around the rotational planes A, B.

The present arrangement may also be applied to solutions where a mounting structure 7 is arranged in one frame part, for instance the middlemost frame part 3, and upon this mounting structure 7, parts or modules of the vehicle or machine 1 are arranged for which it is particularly preferable to be in a given position, usually in a horizontal position, when the vehicle or machine 1 is in operation. Such parts or modules include a cabin and a boom system, for instance. Arranging the cabin and/or the boom system in such a mounting structure 7 offers the machine builder special advantage because desired stabilization of the lateral position can be implemented substantially in the lower part of the frame part or on its level. Space can be saved in the immediate vicinity of the cabin, boom system and other corresponding structures. This is particularly preferable because said space is often needed for positioning a rotating device as well as various wires and through holes for them. At the same time, it is possible to minimize the total height of the vehicle or machine 1 in both the operating and the transport position.

In some embodiments, the mounting structure 7 may preferably be arranged in such a frame part 2, 3, 4 where there are no shafts for drive wheels, tracks, track systems or tandem shafts, at least not in a manner that would not allow their rotation substantially around the longitudinal axis C of the vehicle or machine. In other words, if drive wheels, tracks, track systems or tandem shafts are arranged in this frame part 2, 3, 4, they may be arranged to form a separate frame part under the terms described above. Alternatively, this frame part 2, 3, 4 may be provided with, for instance, one or more idlers which, for example, balance the loads but do not affect the stabilization of the frame part position.

Figure 6:
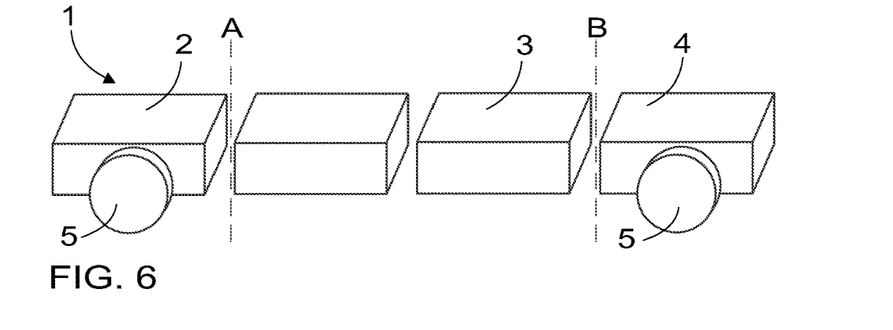

FIG. 6 shows, by way of example, an embodiment with four frame parts. Thus, there may be two or three rotational planes A, B, and they may be positioned between any of the frame parts. A steering joint, by means of which some of the frame parts may be turnable in the lateral direction in relation to each other in the same manner as the rotation of the frame parts around the axis of revolution E substantially perpendicular in relation to the longitudinal axis C shown in FIG. 2b, may thus be arranged between the same frame parts as the rotational plane A or B or between other frame parts. In an arrangement according to the figure, the rotating joint could also be positioned between the frame part 3 and an unnumbered frame part, for example.

Figure 7:
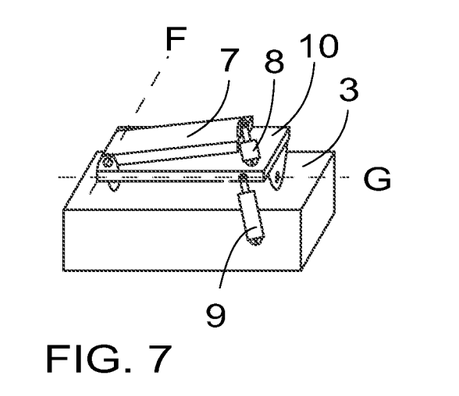
FIG. 7 is a schematic view of a frame part.

FIG. 7 shows, schematically in perspective, a part of a frame part 3, in which the mounting structure 7 is provided with means for rotating the mounting structure 7 such that the cross-profile of the mounting structure 7, formed substantially in the transverse direction in relation to the longitudinal axis C of the vehicle or machine 1, is rotatable around an axis G substantially parallel to the longitudinal axis C in relation to the frame part 2, 3, 4. In the embodiment of FIG. 7, the mounting structure 7 is thus arranged in the frame part 3, and said means for rotating the mounting structure 7 comprises an auxiliary structure 10 arranged in the frame part 3 rotatably in relation to the axis G, and a rotation actuator 9 for rotating the auxiliary structure 10 and the mounting structure 7 arranged therein around the axis G in relation to the frame part 3. Such a solution is particularly preferable when particularly extensive inclination play is required in the lateral direction, i.e. in the direction transverse to the longitudinal axis C. The rotation actuator 9 may be any actuator used in vehicles and/or machines, for example a pressure-medium-operated actuator, such as a hydraulic cylinder, which can be controlled in a manner known as such, for instance hydraulically and/or electrically.

In FIGS. 1a to 6, the frame parts 2, 3, 4 are shown, for the sake of clarity, separate from each other, and structural parts connecting them together are mainly not shown in the figures. Naturally, successive structural parts may, in each case, be connected to each other by any structural parts or structures allowing the features of the independent claims.

The actuators shown, such as the rotation control actuator 6, actuator 8 and/or rotation actuator 9, may be replaced with, for example, a joint actuator arranged directly in connection with the rotation axis in each particular case, such as a vane actuator, or another torque motor generating restricted motion, or another corresponding solution known as such and suitable for the purpose.

The longitudinal axis C described here and serving as the ro-tation axis may be the actual longitudinal axis C of the vehicle or machine 1 as seen in the neutral position of the vehicle or machine 1, or a rotation axis in the vicinity thereof and substantially parallel thereto. For the sake of simplicity, the text mainly refers to the longitudinal axis C.

In some cases, features disclosed in this document may be used as such, irrespective of other features. On the other hand, when necessary, features disclosed in this document may be combined to provide different combinations.

The drawings and the related description are only intended to illustrate the idea of the invention. The details of the invention may vary with-in the scope of the claims.

The invention claimed is:

1. An arrangement of a moving vehicle or machine, comprising:
   at least three frame parts, at least two rotational planes,
   wherein each of the at least two rotational planes is arranged at an interface which separates two frame parts positioned substantially successively in a longitudinal direction of a frame of the vehicle or machine,
   said frame parts being arranged, in relation to each of the at least two rotational planes, rotatably at least around a longitudinal axis of the vehicle or machine or an axis at a distance of not more than 0.5 m and substantially parallel to the longitudinal axis,
   wherein independent rotation of the successive frame parts separated by at least one of the rotational planes around said axis is controlled such that a first frame part suspended between two other frame parts and separated by rotational planes is guided into a substantially horizontal position in relation to the rotation around the longitudinal axis of the vehicle or machine,
   wherein the arrangement comprises at least one rotation control actuator for controlling the rotation of the first frame part around the longitudinal axis of the vehicle or machine, the at least one rotation control actuator being hydraulically or electrically controlled, and
   wherein the at least one rotation control actuator extends in the longitudinal direction of the frame between the first frame part and one of the two other frame parts by having a first end directly connected to the first frame part and a second end directly connected to one of the two other frame parts.

2. An arrangement according to claim 1, wherein the rotational position of a frame part arranged between two other frame parts and separated by rotational planes is arranged to be controllable independently of the rotational position of the adjacent frame parts.

3. An arrangement according to claim 1, wherein the arrangement comprises at least one mounting structure, whose cross-profile formed in the longitudinal direction of the longitudinal axis is arrangeable substantially horizontally in relation to an inclination in the direction of the longitudinal axis of the vehicle or machine.

4. An arrangement according to claim 3, wherein the arrangement comprises at least one actuator for rotating the mounting structure in relation to the frame part around an axis in the direction of the inclination in the direction of the longitudinal axis of the vehicle or machine.

5. An arrangement according to claim 4, wherein the at least one actuator is simultaneously also arranged to control rotation of two successive frame parts on a rotational plane.

6. An arrangement according to claim 4, wherein the at least one rotation control actuator or the at least one actuator for rotating the mounting structure is a pressure-medium-operated actuator.

7. An arrangement according to claim 3, wherein the mounting structure is provided with means for rotating the mounting structure in such a way that the cross-profile of the mounting structure, formed substantially in the transverse direction in relation to the direction of the longitudinal axis of the vehicle or machine, is rotatable around an axis substantially parallel to the longitudinal axis in relation to that frame part in which the mounting structure is arranged.

8. An arrangement according to claim 3, wherein at least a cabin of the vehicle or machine is arranged in the mounting structure.

9. An arrangement according to claim 3, wherein at least a boom system of the vehicle or machine is arranged in the mounting structure.

10. An arrangement according to claim 3, wherein at least a primary power source of the vehicle or machine is arranged in the mounting structure.

11. An arrangement according to claim 1, wherein the independent rotation of the frame parts fitted to each other in the direction of each rotational plane is arranged, in each particular case, by means of at least one rotating joint with at least one degree of freedom.

12. An arrangement according to claim 1, wherein at least two frame parts positioned substantially successively in the direction of the longitudinal axis of the frame of the vehicle or machine are connected to each other with a joint that allows rotation around a substantially vertical axis of revolution that is substantially perpendicular to the longitudinal direction of the frame of the vehicle or machine to improve and/or enable steerability.

13. An arrangement according to claim 1, further comprising:
   a mounting structure rotatably connected to one of the frame parts,
   wherein the at least one rotation control actuator for actively controlling the rotation has a first end connected to the mounting structure and a second end connected to another frame part.

14. A method in connection with a vehicle or machine, wherein the vehicle or machine is a forest work unit, and the method comprising:
   forming the frame of the vehicle or machine of at least three frame parts;
   forming at least two rotational planes between the frame parts; and
   enabling independent rotation of the frame parts positioned, in each particular case, substantially successively in the longitudinal direction of the frame and separated by a rotational plane around a longitudinal axis or an axis at a distance of not more than 0.5 m and substantially parallel to the longitudinal axis in the direction of the rotational plane in such a way that the independent rotation of the successive frame parts separated by at least one of the rotational planes around the longitudinal axis is actively controlled,
   wherein a first frame part suspended between two other frame parts and separated by rotational planes is guided into a substantially horizontal position in relation to the rotation around the longitudinal axis of the vehicle or machine, and wherein the arrangement comprises at least one rotation control actuator for controlling the rotation of the first frame part around the longitudinal axis of the vehicle or machine, the at least one rotation control actuator being hydraulically or electrically controlled, and wherein the at least one rotation control actuator has a first end connected to the first frame part and a second end connected to one of the two other frame parts.

15. A method according to claim 14, wherein the method further comprises providing the vehicle or machine with at least one mounting structure and guiding the cross-profile of the mounting structure, formed in the longitudinal direction of the longitudinal axis of the mounting structure, into a substantially horizontal position in relation to the inclination in the direction of the longitudinal axis.

16. A method according to claim 15, wherein the method further comprises controlling the rotation of the mounting structure in relation to the frame part around an axis substantially perpendicular to the longitudinal axis with at least one rotation control actuator.

17. A method according to claim 16, wherein the method further comprises controlling the rotation of two successive frame parts on a rotational plane with the same at least one rotation control actuator simultaneously.

18. A method according to claim 15, wherein the method further comprises controlling the cross-profile of the mounting structure, formed substantially in the transverse direction in relation to the direction of the longitudinal axis of the vehicle or machine, to rotate around an axis substantially parallel to the longitudinal axis in relation to that frame part in which the mounting structure is arranged.

* * * * *